United States Patent
Hwang et al.

(10) Patent No.: US 9,450,702 B2
(45) Date of Patent: *Sep. 20, 2016

(54) METHOD AND APPARATUS FOR TRANSMITTING AND RECEIVING PACKET IN A COMMUNICATION SYSTEM

(71) Applicant: Samsung Electronics Co., Ltd., Suwon-si, Gyeonggi-do (KR)

(72) Inventors: Sung-Hee Hwang, Suwon-si (KR); Kyung-Mo Park, Seoul (KR); Hyun-Koo Yang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/811,068

(22) Filed: Jul. 28, 2015

(65) Prior Publication Data

US 2015/0333867 A1    Nov. 19, 2015

Related U.S. Application Data

(63) Continuation of application No. 13/873,739, filed on Apr. 30, 2013, now Pat. No. 9,106,376.

(30) Foreign Application Priority Data

| Apr. 30, 2012 | (KR) | 10-2012-0045337 |
| Sep. 11, 2012 | (KR) | 10-2012-0100528 |
| Apr. 23, 2013 | (KR) | 10-2013-0045082 |

(51) Int. Cl.
*H03M 13/00* (2006.01)
*H04L 1/00* (2006.01)

(52) U.S. Cl.
CPC ............ *H04L 1/004* (2013.01); *H04L 1/0041* (2013.01); *H04L 1/0057* (2013.01); *H04L 1/0075* (2013.01)

(58) Field of Classification Search
None
See application file for complete search history.

(56) References Cited

U.S. PATENT DOCUMENTS

| 5,870,412 A | 2/1999 | Schuster et al. |
| 6,079,042 A | 6/2000 | Vaman et al. |
| 6,434,606 B1 | 8/2002 | Borella et al. |
| 7,447,978 B2 | 11/2008 | Hannuksela |
| 7,660,245 B1 | 2/2010 | Luby |
| 7,676,735 B2 | 3/2010 | Luby et al. |
| 7,853,856 B2 | 12/2010 | Vedantham et al. |
| 7,876,685 B2 | 1/2011 | Botzko et al. |
| 7,971,129 B2 | 6/2011 | Watson et al. |
| 2002/0194570 A1 | 12/2002 | Birru et al. |

(Continued)

FOREIGN PATENT DOCUMENTS

| WO | 2011-068495 A1 | 6/2011 |
| WO | 2011/108904 A2 | 9/2011 |
| WO | 2012-005544 A2 | 1/2012 |

*Primary Examiner* — Daniel McMahon
(74) *Attorney, Agent, or Firm* — Jefferson IP Law, LLP

(57) ABSTRACT

A method for transmitting a packet in a communication system is provided. The method includes dividing a data stream into data payloads of a predetermined size and adding a common header to each of the data payloads, to generate a source payload, adding a first Forward Error Correction (FEC) payload Identifier (ID) to the source payload and applying an FEC code thereto, to generate an FEC source packet for a source payload, adding a second FEC payload ID to at least one parity payload and applying an FEC code thereto, to generate an FEC parity packet for the at least one parity payload, and transmitting the FEC source packet and the FEC parity packet.

2 Claims, 16 Drawing Sheets

(56) References Cited

U.S. PATENT DOCUMENTS

| | | |
|---|---|---|
| 2005/0166123 A1 | 7/2005 | Yanamoto et al. |
| 2008/0008155 A1 | 1/2008 | Yoon et al. |
| 2008/0151776 A1 | 6/2008 | Kure |
| 2009/0168708 A1 | 7/2009 | Kumar et al. |
| 2009/0193318 A1 | 7/2009 | Schoenblum |
| 2009/0307564 A1 | 12/2009 | Vedantham et al. |
| 2010/0050057 A1 | 2/2010 | Luby |
| 2011/0219279 A1 | 9/2011 | Abu-Surra et al. |
| 2011/0280261 A1 | 11/2011 | Varadarajan et al. |
| 2013/0013982 A1 | 1/2013 | Hwang et al. |
| 2013/0097474 A1 | 4/2013 | Hwang et al. |
| 2013/0111302 A1 | 5/2013 | Cho et al. |

$$H = \begin{bmatrix} H_I & H_P \end{bmatrix}$$

$$= \begin{bmatrix} H_I & \begin{matrix} P & I & O & \cdots & O & O \\ O & I & I & \cdots & O & O \\ \vdots & O & I & \cdots & O & O \\ I & \vdots & \vdots & \cdots & \vdots & \vdots \\ \vdots & \vdots & \vdots & \cdots & I & O \\ O & O & O & \cdots & I & I \\ P & O & O & \cdots & O & I \end{matrix} \end{bmatrix}, \quad P = \begin{bmatrix} 0 & 1 & 0 & & 0 \\ 0 & 0 & 1 & \cdots & 0 \\ \vdots & \vdots & \vdots & & \vdots \\ 0 & 0 & 0 & \cdots & 1 \\ 1 & 0 & 0 & & 0 \end{bmatrix}_{L \times L}$$

FIG.18

METHOD AND APPARATUS FOR TRANSMITTING AND RECEIVING PACKET IN A COMMUNICATION SYSTEM

CROSS-REFERENCE TO RELATED APPLICATION(S)

This application is a continuation application of a prior application Ser. No. 13/873,739, filed on Apr. 30, 2013, which claimed the benefit under 35 U.S.C. §119(a) of a Korean patent application filed on Apr. 30, 2012 in the Korean Intellectual Property Office and assigned Serial number 10-2012-0045337, of a Korean patent application filed on Sep. 11, 2012 in the Korean Intellectual Property Office and assigned Serial number 10-2012-0100528, and of a Korean patent application filed on Apr. 23, 2013 in the Korean Intellectual Property Office and assigned Serial number 10-2013-0045082, the entire disclosure of each of which is hereby incorporated by reference.

BACKGROUND OF THE INVENTION

1. Field of the Invention

The present invention relates to a communication system. More particularly, the present invention relates to a method and apparatus for transmitting and receiving packets in a communication system.

2. Description of the Related Art

Due to diversification of content and an increase in high-capacity content, such as High Definition (HD) content and Ultra High Definition (UHD) content, communication systems may suffer from increasing data congestion. Because of this, the content sent by a sender, for example, a host A, may not be normally delivered to a receiver, for example, a host B, and some of the content may be lost in its route.

Generally, since data is transmitted in packets, the loss of content occurs on a packet basis. The packet is comprised of one block, for example, a payload of data to be transmitted, address information, for example, a source address and a destination address, and management information, for example, a header. Therefore, if a packet loss occurs in the network, a receiver may not know the data and management information in the lost packet since it cannot receive the lost packet, thereby causing the user inconvenience in various forms such as quality degradation of audio, quality degradation and image breakage of video, subtitle missing, file loss, and the like.

For these reasons, Application Layer-Forward Error Correction (AL-FEC) is used as a way to recover the data loss which has occurred in the network, and there is a need for a way to configure an FEC packet for AL-FEC and transmit and receive the FEC packet.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and apparatus for configuring a Forward Error Correction (FEC) packet for Application Layer-Forward Error Correction (AL-FEC) operation and transmitting and receiving the FEC packet, to improve the reliability of the network by transmitting a parity packet that is generated using one or more error-correcting codes together with a data packet in a communication system supporting a packet-based communication scheme.

In accordance with an aspect of the present invention, a method for transmitting a packet in a communication system is provided. The method includes generating a source payload by dividing a data stream into data payloads of a predetermined size and adding a common header to each of the data payloads, generating an FEC source packet for the source payload by adding a first FEC payload Identifier (ID) to the source payload and applying an FEC code to the source payload, generating an FEC parity packet for at least one parity payload by adding a second FEC payload ID to the at least one parity payload and applying an FEC code to the at least one parity payload, and transmitting the FEC source packet and the FEC parity packet.

In accordance with another aspect of the present invention, an apparatus for transmitting a packet in a communication system is provided. The apparatus includes a source payload generator generating a source payload by dividing a data stream into data payloads of a predetermined size and adding a common header to each of the data payloads, a controller generating a FEC source packet by adding a first FEC payload ID to the source payload and applying an FEC code to the source payload, and generating an FEC parity packet for at least one parity payload by adding a second FEC payload ID to at least one parity payload and applying an FEC code to the at least one parity payload, and a transmitter for transmitting the FEC source packet and the FEC parity packet.

In accordance with further another aspect of the present invention, method for receiving a packet in a communication system is provided. The method includes determining whether a packet received from a sender is a Forward Error Correction (FEC) source packet and an FEC parity packet, and acquiring a source payload from the FEC source packet, and acquiring a parity payload from the FEC parity packet, wherein the source payload may be generated by dividing a data stream into data payloads of a predetermined size and adding a common header to each of the data payloads, wherein the FEC source packet may be generated by adding a first FEC payload Identifier (ID) to the source payload and applying an FEC code to the source payload, and wherein the FEC parity packet may be generated by adding a second FEC payload ID to the parity payload and applying an FEC code to the parity payload.

In accordance with yet another aspect of the present invention, an apparatus for receiving a packet in a communication system is provided. The apparatus includes a controller determining whether a packet received from a sender is a Forward Error Correction (FEC) source packet and an FEC parity packet, acquiring a source payload from the FEC source packet, and acquiring a parity payload from the FEC parity packet, wherein the source payload may be generated by dividing a data stream into data payloads of a predetermined size and adding a common header to each of the data payloads, wherein the FEC source packet may be generated by adding a first FEC payload Identifier (ID) to the source payload and applying an FEC code to the source payload, and wherein the FEC parity packet may be generated by adding a second FEC payload ID to the parity payload and applying an FEC code to the parity payload.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which:

FIG. 18 illustrates a structure of an H matrix according to an exemplary embodiment of the present invention.

Throughout the drawings, like reference numerals will be understood to refer to like parts, components, and structures.

DETAILED DESCRIPTION OF EXEMPLARY EMBODIMENTS

Figure 1A:
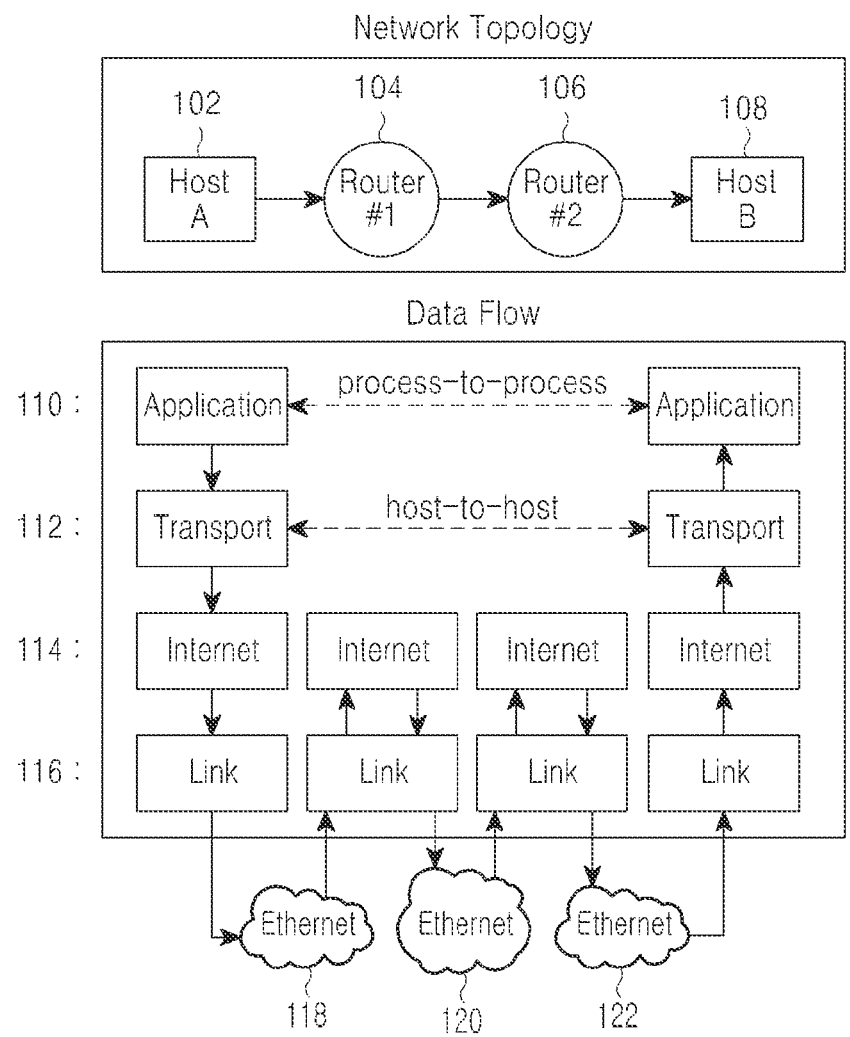
FIGS. 1A and 1B illustrate a network topology and a data flow according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skilled in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

First, the terms to be used herein will be defined as follows:

Forward Error Correction (FEC) Code: an error-correcting code for correcting an error or an erasure symbol;

FEC Frame: a codeword, which is generated by FEC-encoding the data to be protected, and is comprised of an information part and a parity part or repair part;

Symbol: a unit of data processed by the FEC code;

Information Symbols: unprotected data or padding symbols which is the information part of an FEC frame;

Codeword: an FEC frame generated by FEC-encoding information symbols;

Parity Symbols: parity symbols of an FEC frame generated by FEC-encoding an information symbols;

Packet: a transmission unit comprised of a header and a payload;

Payload: a piece of user data which is to be transmitted by the sender and which is placed inside a packet;

Packet Header: a header for a packet including a payload;

Source Payload: a payload comprised of source symbols;

Information Payload: a payload comprised of information symbols;

Parity Payload: a payload comprised of parity symbols;

Source Block: a set of payloads each comprised of one or more source payloads;

Information Block: a set of payloads each comprised of one or more information payloads;

Parity Block: a set of payloads each comprised of one or more parity payloads;

FEC Block: a set of codewords, or a set of payloads each comprised of an information block and a parity block;

FEC Delivery Block: a set of payloads each comprised of a source block and a parity block;

FEC Packet: a packet for carrying an FEC block;

Source Packet: a packet for carrying a source block;

Repair Packet: a packet for carrying a repair block;

FEC Packet Block: a set of packets for carrying an FEC delivery block;

Motion Pictures Expert Group (MPEG) Media Transport (MPEG) Media Transport (MMT): an international standard established to efficiently transmit MPEG data;

Source Flow: a Source Flow is a sequence of Source Payloads identified by the same Source Flow identifier to deliver one or more MMT Assets from one MMT Server to one or more MMT Clients;

Parity Flow: a Parity Flow is a sequence of Parity Payloads, which are generated by FEC encoding to protect a Source Flow, identified by the same Parity Flow identifier;

FEC Flow: an FEC Flow consists of a Source Flow and its associated one or more Parity Flows;

FEC Payload Identifier (ID): information that identifies the Information Payloads or sub-Payloads carried by an FEC Source Packet or the Parity Payloads carried by an FEC Parity Packet;

FEC Source Payload ID: FEC Payload ID for Source Packet;

FEC Parity Payload ID: FEC Payload ID for Parity Packet;

Access Unit (AU): an access unit is the smallest data entity to which timing information can be attributed, for non-timed data, whose timing information is not associated, the AU is not defined;

Media Fragment Unit (MFU): is a generic container, independent of any specific media codec, containing coded media data that is independently consumable by a media decoder, and is equal to or smaller than an AU and contains information that can be utilized by delivery layers;

MMT Processing Unit: is a generic container, independent of any specific media codec, containing one or more AUs and additional delivery and consumption related information, wherein for non-timed data, the MPU contains portion of data without an AU boundaries identified, and it defines coded media data unit that can be completely and independently processed in MMT, and in this context processing means encapsulation into MMT Package or packetization for delivery;

MMT Asset: is a logical data entity that is composed of one or more MPUs, and is the largest data unit for which same composition information and transport characteristics are applied, and an MMT Asset contains only one kind of data type including packaged or multiplexed data, e.g. a portion of audio ES, a portion of video ES, an MPEG-U Widget Package, a portion of MPEG-2 TS, a portion of MP4 file, and a portion of MMT Package;

MMT Composition Information (MMT-CI): is description about spatial and temporal composition of MMT Assets;

MMT Media Characteristics for Transmission (MMT-MCT): is description about required Quality of Service (QoS) for delivery of MMT Assets. MMT-MCT is represented by the parameters agnostic to specific delivery environment;

MMT Package: is a logically structured collection of data, which is composed of one or more MMT Assets, MMT-CI and MMT-MCT, and may also have assigned descriptive information such as an identifier;

MMT Payload Format (MMT-PF): is a format of payload for MMT Package or MMT signaling message to be carried by MMT Protocol or Internet application layer protocols, e.g. Real Time Protocol (RTP); and MMT Transport Packet (MMTP): is an application layer protocol for delivering MMT-PF over an Internet Protocol (IP) network.

The terms 'parity' and 'repair' as used herein have the same meanings, so they are interchangeable with each other.

Figure 1B:
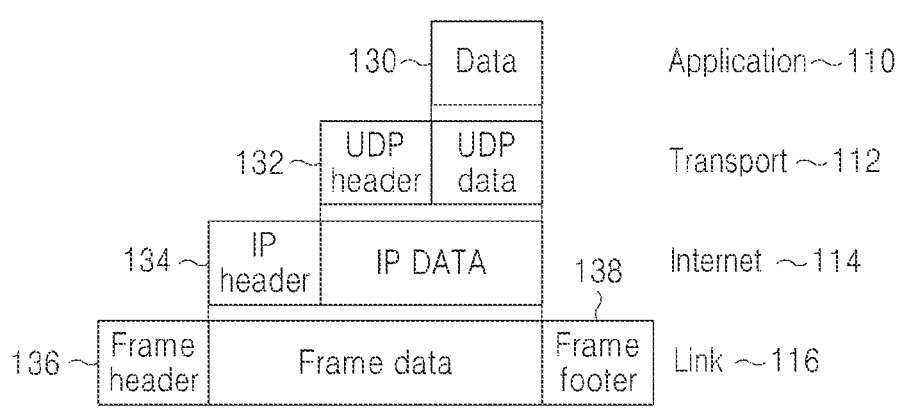

FIGS. 1A and 1B illustrate a network topology and a data flow according to an exemplary embodiment of the present invention.

Referring to FIG. 1A, a network topology includes a host A 102 operating as a sender, and a host B 108 operating as a receiver. The host A 102 is connected to the host B 108 via one or more routers 104 and 106. The host A 102 and the host B 108 are connected to the routers 104 and 106 via Ethernets 118 and 122, and the routers 104 and 106 may be connected to each other via a fiber, satellite communication or other possible physical network, such as Ethernet 120. Data flow between the host A 102 and the host B 108 is achieved by a link layer 116, an Internet layer 114, a transport layer 112 and an application layer 110.

Referring to FIG. 1B, the application layer 110 generates data 130 to be transmitted, by Application Layer-FEC (AL-FEC). The data 130 may be Real Time Protocol (RTP) packet data generated by dividing the data that is compressed in an Audio/Video (AV) codec, using an RTP protocol, or may be MMT packet data generated in accordance with MMT. The data 130 is converted by the transport layer 112 into a User Datagram Protocol (UDP) packet 132 into which, for example, a UDP header is inserted. The Internet layer 114 generates an IP packet 134 by attaching an IP header to the UDP packet 132. The link layer 116 configures a frame 136 to be transmitted, by attaching a frame header and, if necessary, a frame footer to the IP packet 134.

Figure 2:
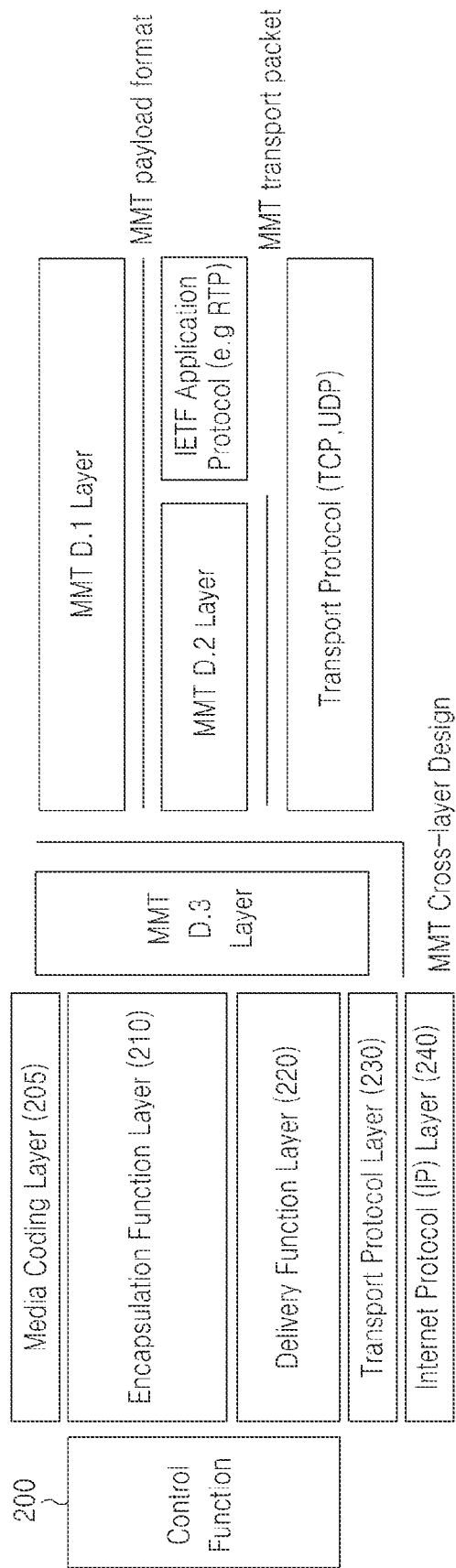
FIG. 2 illustrates a configuration of an Motion Pictures Expert Group (MPEG) Media Transport (MMT) system according to an exemplary embodiment of the present invention.

FIG. 2 illustrates a configuration of an MMT system according to an exemplary embodiment of the present invention.

Referring to FIG. 2, a configuration of an MMT system is illustrated on the left, and the detailed structure of a delivery function is illustrated on the right. A media coding layer 205 compresses audio and/or video data, and delivers it to an encapsulation function layer 210, which may also be referred to as an E. Layer 210. The encapsulation function layer 210 packetizes or encapsulates the compressed audio/video data in a form similar to a file format, and delivers it to a delivery function layer 220, which may also be referred to as a D. Layer.

The delivery function layer 220 formats an output of the encapsulation function layer 210 into an MMT payload, adds an MMT transport packet header thereto, and delivers it to a transport protocol layer 230 in the form of an MMT transport packet. Alternatively, the delivery function layer 220 delivers an output of the encapsulation function layer 210 to the transport protocol layer 230 in the form of an RTP packet using the existing RTP protocol. Thereafter, the transport protocol layer 230 converts the input RTP packet into any one of a UDP packet and a Transmission Control Protocol (TCP) packet, and transfers it to an IP layer 240. Finally, the IP layer 240 converts an output of the transport protocol layer 230 into an IP packet, and transmits it using an IP protocol.

An FEC packet according to the present exemplary embodiments is available in the form of at least one of an MMT payload format, an MMT transport packet, and an RTP packet. A control function layer 200, which may also be referred to as a C. Layer 200, manages a presentation session and a delivery session.

Figure 3:
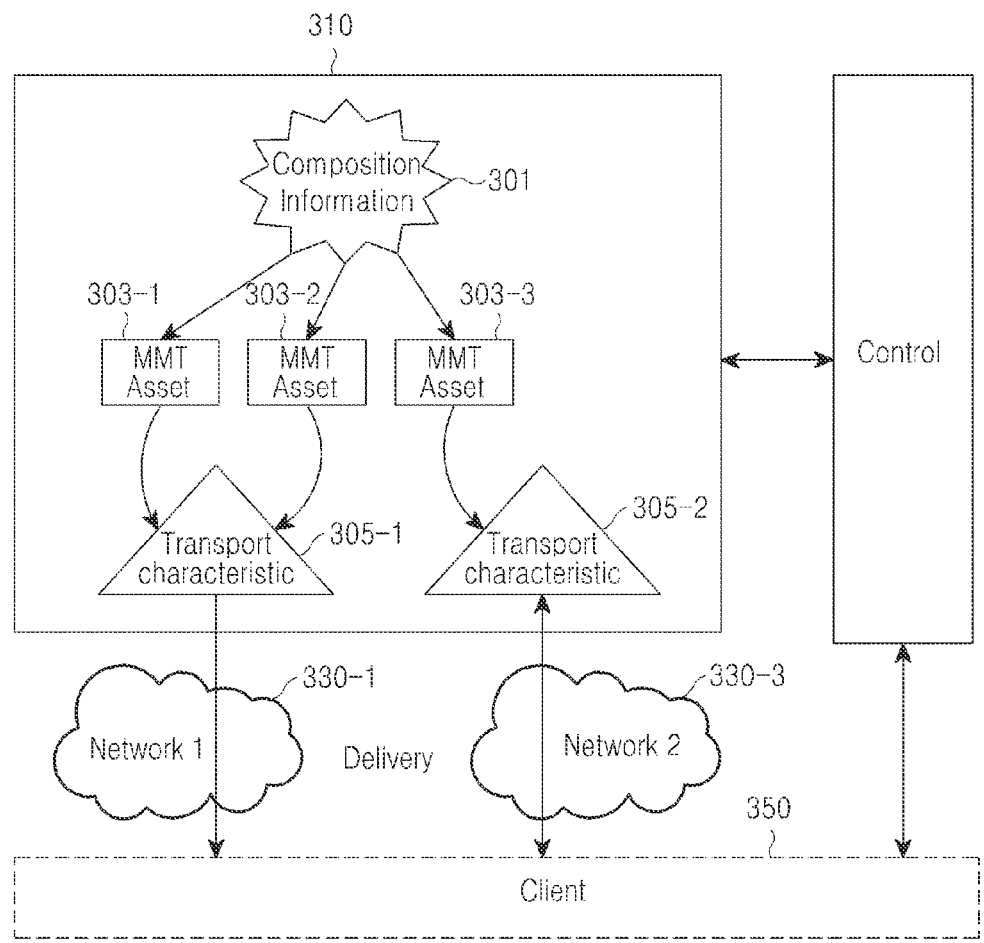
FIG. 3 illustrates a structure of an MMT package according to an exemplary embodiment of the present invention.

FIG. 3 illustrates a structure of an MMT package according to an exemplary embodiment of the present invention.

Referring to FIG. 3, an MMT package 310 is transmitted and received to/from a client 350 via delivery function layers 330-1 and 330-2 of the network, and includes MMT assets 303-1 to 303-3, composition information 301, and transport characteristics 305-1 and 305-2. The MMT package 310 may utilize configuration information. The configuration information is comprised of a list of the MMT assets 303-1 to 303-3, the composition information 301, and the transport characteristics 305-1 and 305-2.

Description information describes the MMT package 310 and the MMT assets 303-1 to 303-3. The composition information 301 assists in consumption of the MMT assets 303-1 to 303-3. The transport characteristics 305-1 and 305-2 provide information for delivery of the MMT assets 303-1 to 303-3. The MMT package 310 describes transport characteristics of each MMT asset separately. The transport characteristics 305-1 and 305-2 include error resiliency information, and simple transport characteristic information for one MMT asset that may or may not be lost. The transport characteristics 305-1 and 305-2 may include Quality of Service (QoS) information and allowable loss and allowable delay information of each MMT asset.

Figure 4:
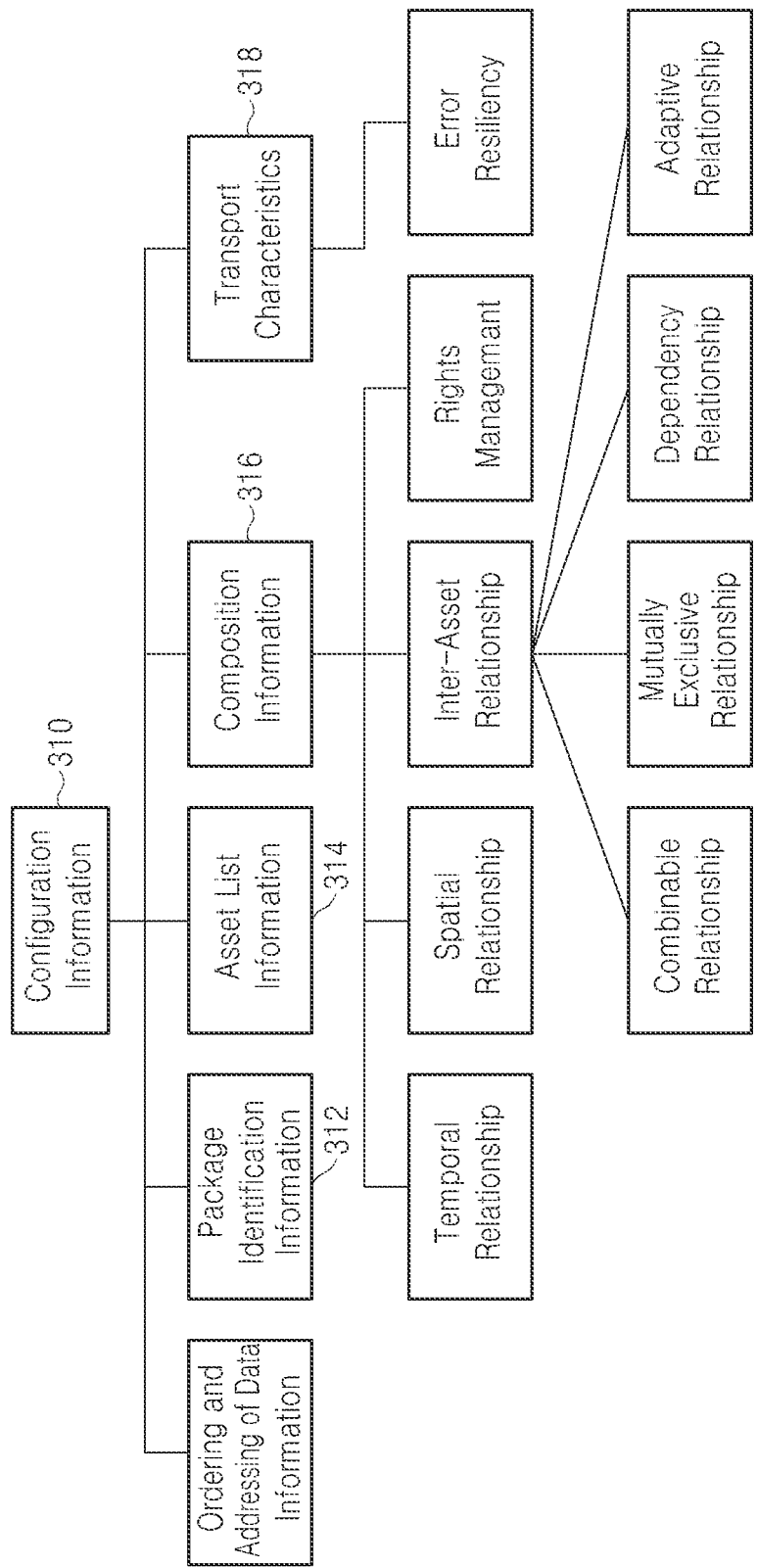
FIG. 4 illustrates a structure of configuration information included in an MMT package and its sub information according to an exemplary embodiment of the present invention.

FIG. 4 illustrates a structure of configuration information included in an MMT package and its sub information according to an exemplary embodiment of the present invention.

As illustrated in FIG. 4, configuration information 310 includes package identification information 312, asset list information 314, which is a component of the package, composition information 316, transport characteristics 318, and additional information together with content, and provides structural information indicating how and where these components are included in the package.

Figure 5:
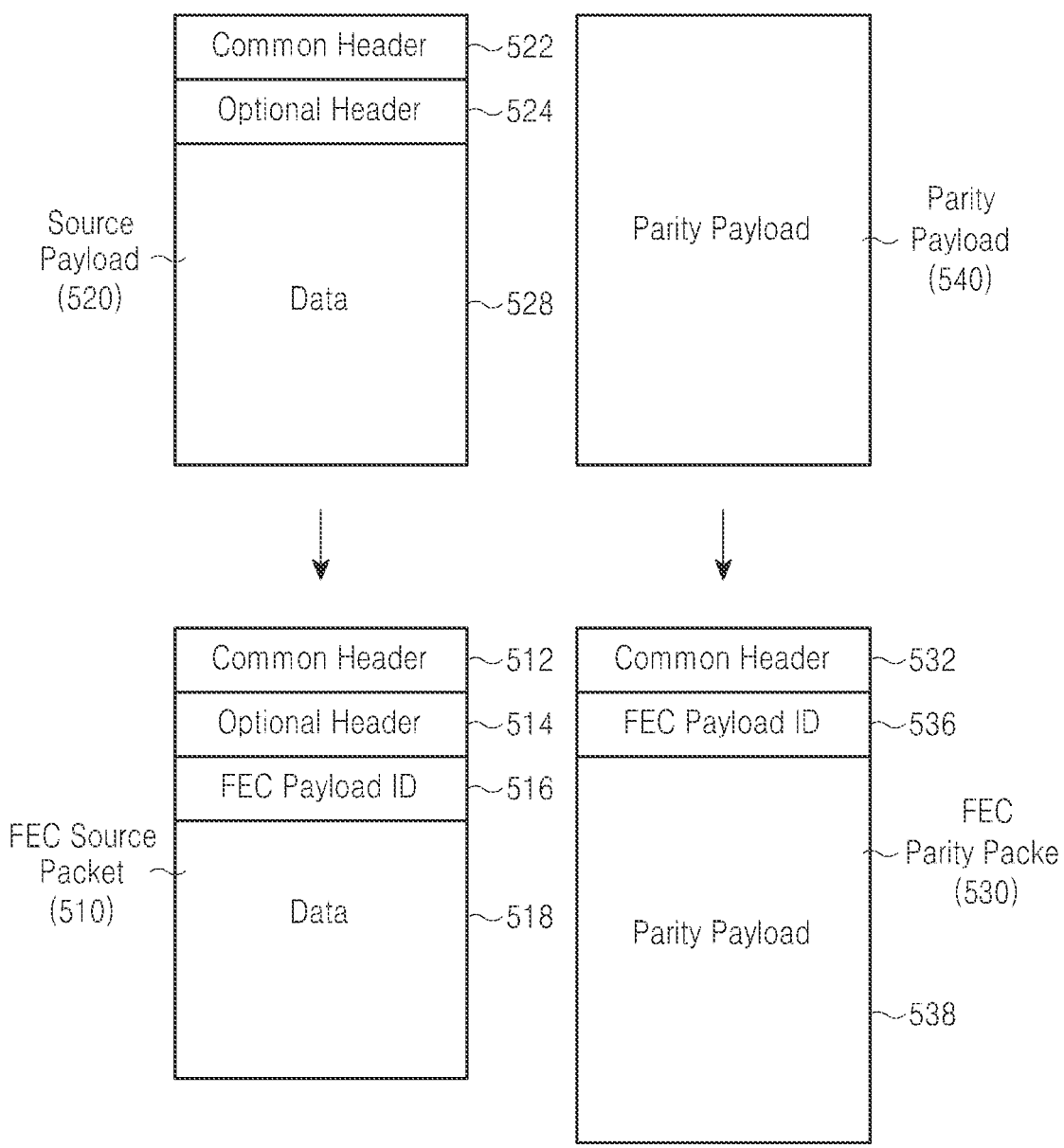
FIG. 5 illustrates a structure of a Forward Error Correction (FEC) packet format according to an exemplary embodiment of the present invention.

FIG. 5 illustrates a structure of an FEC packet format according to an exemplary embodiment of the present invention.

An FEC source packet 510, which is an FEC packet for a source payload 520 that includes a common header 522, an optional header 524, and data 528, is comprised of a common header 512, an optional header 514, an FEC payload ID 516 for the source payload 520, and data 518. The FEC source packet 510 is generated by adding the FEC payload ID 516 for the source payload 520 to the source payload 520 comprised of the common header 512, the optional header 514 and the data 518.

An FEC parity packet 530, which is an FEC packet for a parity payload 540, is comprised of a common header 532, an FEC payload ID 536 for a parity payload, and a parity payload 538. The FEC parity packet 530 is generated by adding the common header 532 and the FEC payload ID 536 for a parity payload to the parity payload 538 generated by FEC encoding.

Although it is assumed in FIG. 5 that the FEC payload ID 516 is placed in front of the data 518 or the parity payload 538, the present invention is not limited thereto, and the FEC payload ID 516 may be placed at the rear of the data 518 or the parity payload 538 or at any similar and/or suitable location.

It is preferable that a common header, which may be the common header 512 or the common header 532 or any other common header such as common header 522, is placed in the same position within the FEC packet. The common header, which may be the common header 512, 522, or 532, includes a Type information field to make it possible to easily determine whether an FEC packet received at an FEC packet receiver is an FEC source packet or an FEC parity packet. In addition, the common header, which may be the common header 512, 522, or 532, may include an information field indicating whether FEC is applied. In some cases, the information field indicating whether FEC is applied is stored in, and carried by, a separate packet for delivering control information, which is different from the FEC packet. Data of the FEC source packet may have several data types, which may include, for example, audio data, video data, file data, timed data, non-timed data, MPU, MFU and the like. The several data types may be distinguished by a value of a Type filed of the common header, which may be the common header 512, 522, or 532. Particularly, in the case of the FEC parity packet 530, the parity packet may be distinguished from the source packet by setting a value of the Type field of the common header 532 as information indicating parity. However, if there are multiple parities, they are separately distinguished. For example, in the case of Two Stages Coding Structure, Parity1 and Parity2 are additionally distinguished.

The term 'common header information' as used herein refers to a header having an information field that is applied in common to a parity payload, in the header information for a data payload. The common header information includes information that makes it possible to determine whether a received packet is a packet for a data payload or a packet for a parity payload. In addition, the information indicating whether FEC is applied to the received FEC packet may be carried in the FEC packet, or carried by a separate packet for control information, which is different from the FEC packet. The common header information indicating whether the FEC is applied or not may indicate or mark application of FEC in the common header when a source payload is generated, i.e., before FEC encoding, and then undergo FEC encoding. Alternatively, the common header information indicating whether the FEC is applied or not may indicate non-application of FEC in the common header when a source payload is generated, and then indicate application of FEC when an FEC packet for a source payload is generated by adding an FEC payload ID for a source payload to the source payload after FEC encoding. In the latter case, recognizing that a received FEC packet for a source payload is an FEC-applied packet, a receiver may change the common header information indicating whether the FEC is applied or not to indicate again non-application of FEC, then generates an FEC packet for a source payload, and then performs FEC decoding thereupon. As the common header is placed in a fixed position, such as in front of or at the rear of the FEC packet, the receiver may determine whether a received FEC packet is a packet for a data payload or a packet for a parity payload.

Table 1 below illustrates, as an example of a common header of the present exemplary embodiments, FEC type information in an MMT packet header which indicates whether FEC is applied, whether the received packet is an FEC source packet, and whether the received packet is an FEC repair packet.

TABLE 1 value of FEC_type

| Value | Description |
|---|---|
| 0 | MMT packet without AL-FEC protection |
| 1 | MMT packet with AL-FEC protection; FEC source packet |
| 2 | MMT packet for repair symbol; FEC repair packet |
| 3 | Reserved for future use |

In Table 1, FEC type=0 indicates an MMT packet to which FEC is not applied. FEC type=1 indicates an MMT packet to which FEC is applied. FEC type=2 indicates an MMT packet for a parity payload, which is generated after FEC encoding.

For the data a sender is to transmit by applying FEC, the sender generates MMT packets, i.e., a source payload, whose FEC type is set as '1', then generates information payloads, and then performs FEC encoding thereupon to generate a parity payload. For the parity payload generated by FEC encoding, an FEC packet for a parity payload is generated by adding an MMT header whose FEC type is set as '2', an MMT payload header, and an FEC payload ID for a parity payload, and then the FEC packet for a parity payload, such as FEC parity packet 530, is transmitted together with the FEC packet for a source payload, such as the FEC Source Packet 510. Based on the FEC type information in the MMT packet header of received MMT packets, a receiver determines whether FEC is applied to the received packet and whether the received packet is an FEC source packet or an FEC repair packet, and then performs FEC decoding on the FEC-applied FEC source packet and FEC repair packet, thereby recovering the packet that is lost during transmission of the packet.

Alternatively, for the data the sender desires to transmit by applying FEC, the sender generates MMT packets whose FEC type is set as '0', then generates information payloads, and then performs FEC encoding thereupon to generate a parity payload. When generating an FEC source packet for a source payload by adding an FEC payload ID to the MMT packet after performing FEC encoding, the sender changes the FEC type in the MMT packet header to '1'. In other words, in the case of an MMT packet to which FEC is applied, the MMT packet is input to an FEC module after the FEC type is set as '0', and in the case of an FEC packet for a source payload after FEC encoding, the FEC type is set as '1'. For a parity payload generated by FEC encoding, the sender generates an FEC packet for a parity payload by adding an MMT header with FEC type=2, an MMT payload header, and an FEC payload ID for a parity payload, to the generated parity payload, and then transmits it together with an FEC packet for a source payload. Based on the FEC type information in the MMT packet header of received MMT packets, the receiver determines whether FEC is applied to the received packet and whether the received packet is an FEC source packet or an FEC repair packet, then removes the FEC payload ID from the FEC source packet using the FEC-applied FEC source packet, which has the FEC type=1, and FEC repair packet, which has the FEC type=1, converts them into MMT packets for a source payload by changing the FEC type to FEC type=0, and then performs FEC decoding on the parity payload of the FEC repair packet, thereby recovering the packet that is lost during transmission of the packet.

The optional header 514 of the FEC source packet 510 is information that is applied only to the source packet, and includes at least one of fragmentation status information of the MPU and/or the MFU, header length information, and information indicating the identity of an asset related to data of the packet. Although this information may be an asset ID in the present exemplary embodiments, it is preferable to increase the transmission efficiency by transmitting compressed asset ID information that is mapped to the asset ID. In this case, the asset ID and the compressed asset ID information mapped thereto are transmitted in an out-of-band manner, such as via an out-of-band signal.

In the case of an FEC header, an FEC payload ID for a source packet and an FEC payload ID for a parity packet may be identical to or different from each other, depending on the information block generation method, the FEC control information, and the FEC-related control information arrangement method. FEC payload ID information includes at least one of FEC flow information, FEC coding structure information, source packet count information or the number of source packets, information payload count information, parity packet count information, a Packet Sequence Number such as a Source/Parity Packet Sequence Number, or Information/Parity Payload ID which is information indicating indexes of information payloads and parity payloads in an FEC block, and Block Boundary Info or Source Block Number.

In the MMT system illustrated in FIG. 2, when FEC is applied thereto, the FEC packet is input with the MMT D.2 Layer or an application protocol such as RTP, as an output of the MMT D.1 Layer. However, if FEC is not applied thereto, the FEC packet becomes a source payload and is an output of the MMT D.1 Layer since it does not require the FEC payload ID. Although not illustrated in FIG. 2, the FEC packet of the present exemplary embodiments may include an FEC payload ID if FEC is applied thereto, and the FEC packet is a source payload itself without the FEC payload ID if FEC is not applied thereto.

An MMT server transmits one or multiple MMT assets to an MMT client. Each asset is comprised of one or multiple MPUs, and each MPU is packetized into one or multiple MMT Payload Formats (MMT-PFs) in the D.1 Layer. An MMT Transport Packet (MMT-TP) is generated by adding a D.2 header and is transferred to a lower layer. In a case having transmission of multiple MMT assets, a D.2 header of the MMT-TP for each of the assets is transmitted by storing information, for example, an Asset_ID, for identifying each of the assets, indicating data of which of the assets each of the transmission MMT-TPs carries. As multiple MMT assets being transmitted constitute one source flow for an individual MMT asset, one parity flow is generated and protected by FEC. Alternatively, as two or more assets constitute one source flow, one parity flow is generated and protected by FEC. Some assets may be protected by FEC while other assets may not be protected by FEC. For example, in the Two Stage FEC coding structure or Layer-Aware FEC coding structure, two or more parity flows may be generated and protected in one source flow.

When protected by FEC, one source flow comprised of one or multiple MMT assets is transmitted after converting the parity payloads in the parity flow generated by FEC into MMT-TP, like the MMT asset, and each D.2 header is transmitted by storing information, for example, the Asset ID, for identifying the parity payloads. For example, in the Two Stage FEC or Layer-Aware (LA)-FEC coding structure, if two or more parity flows are generated, each parity flow may be distinguished by a parity flow ID. In this case, FEC flow IDs corresponding to the number of transmission FEC flows are defined as FEC out-of-band signals, and mapping information for a source flow and a parity flow corresponding to each FEC flow ID is provided.

For example, in a case where a video asset, an audio asset, a widget asset, and a file asset are transmitted, if the video, audio and widget assets are composed as one source flow and protected in the Two Stage FEC coding structure, and if the file asset is composed as another source flow and protected in the One Stage FEC coding structure, then an FEC out-of-band signal carries the following information.

Video Asset: Asset ID=1
Audio Asset: Asset ID=2
Widget Asset: Asset ID=3
File Asset: Asset ID=4
Number of FEC Flows=2
■FEC Flow ID=1
FEC coding structure: Two Stage FEC coding structure
Source Flow: Asset ID 1, 2, 3
Parity Flow1: Asset ID 101
Parity Flow2: Asset ID 102
■FEC Flow ID=2
FEC coding structure: One Stage FEC coding structure
Source Flow: Asset ID 4
Parity Flow: Asset ID 103
In addition, by setting;
Asset ID=1 in an MMT TP Header carrying Video Asset,
Asset ID=2 in MMT TP Header carrying Audio Asset,
Asset ID=3 in MMT TP Header carrying Widget Asset,
Asset ID=101 in MMT TP Header carrying Parity Flow1,
Asset ID=102 in MMT TP Header carrying Parity Flow2,
Asset ID=4 in MMT TP Header carrying File Asset, and
Asset ID=103 in MMT TP Header carrying Parity Flow for File Asset, The receiver may smoothly perform FEC decoding by determining, based on the FEC out-of-band signal and the Asset ID information in the MMT TP header, that the Asset ID fields with values of 1, 2, 3, 101 and 102 constitute one FEC flow and that the Asset ID fields with values of 4 and 103 constitute another FEC flow.

Figure 6:
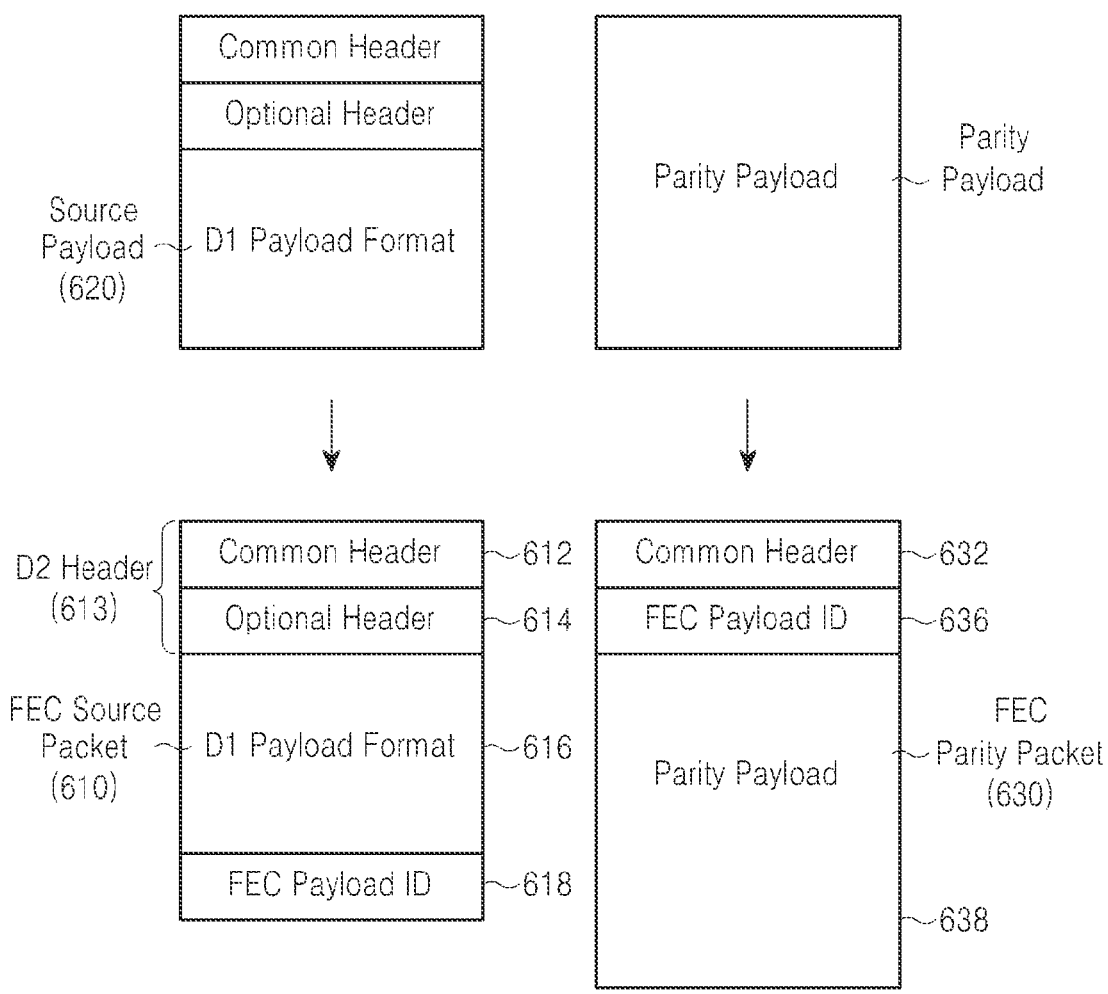
FIG. 6 illustrates a structure of an FEC packet format in which a source payload is an MMT transport packet, according to an exemplary embodiment of the present invention.

FIG. 6 illustrates a structure of an FEC packet format in which a source payload is an MMT transport packet, according to an exemplary embodiment of the present invention.

Referring to FIG. 6, an FEC source packet 610, of a source payload 620, is comprised of a D2 header 613 which consists of a common header 612 and an optional header 614, a D1 payload format 616, and an FEC payload ID 618. An FEC parity packet 630 is comprised of a common header 632, an FEC payload ID 636, and a parity payload 638. In the common header 632, an ID field for distinguishing the assets is configured, and in the case of a parity packet, an ID value for identifying the parity flow is set. The common header 632 may include a Global Sequence Number field, a Delivery Time Stamp field, and the like. Although not illustrated, in the case of FIG. 6, for the FEC parity packet 630, the common header 632 may be followed by an optional header. In other words, the D2 header 613 of the FEC source packet may be the same as a D2 header of the FEC parity packet (not shown), which includes the common header 632 and the optional header. In this regard, since the MMT TP header performs a function of a protocol, the network entity may drop the FEC parity packet when it drops a packet depending on the congestion situation of the network. Therefore, the FEC parity packet may have the same header structure as that of the FEC source packet.

Figure 7:
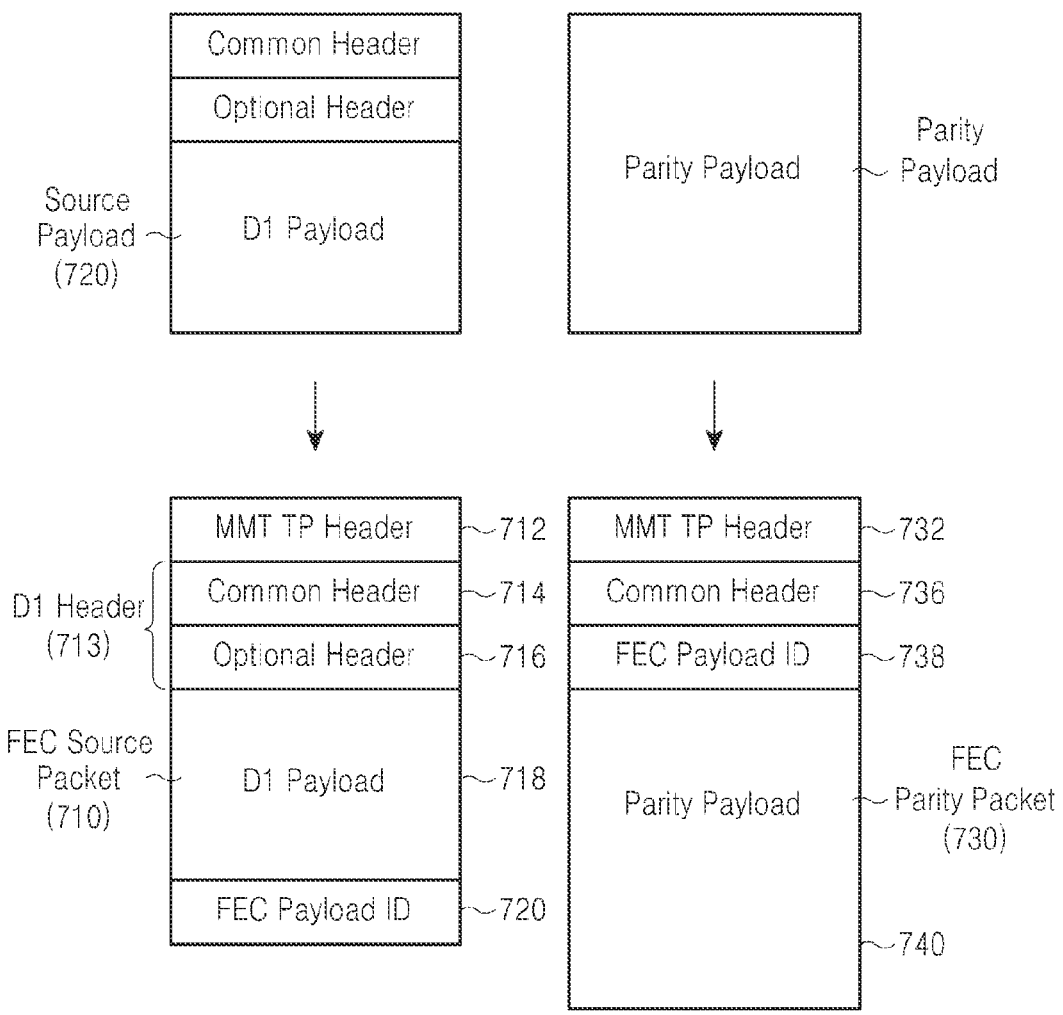
FIG. 7 illustrates a structure of an FEC packet format in which a source payload is an MMT payload format, according to an exemplary embodiment of the present invention.

FIG. 7 illustrates a structure of an FEC packet format in which a source payload is an MMT payload format, according to an exemplary embodiment of the present invention.

An FEC source packet 710, of a source payload 720, is comprised of an MMT TP header 712, a D1 header 713 which is consists of a common header 714 and an optional header 716, a D1 payload 718, and an FEC payload ID 720, and an FEC parity packet 730 is comprised of an MMT TP header 732, a common header 736, an FEC payload ID 738, and a parity payload 740. In this case, an Asset ID field of the MMT TP header 732 is prepared. For an Asset ID field for the FEC source packet 710, an ID value for identifying each of the assets is set. For an Asset ID field for the FEC parity packet 730, an ID value for identifying a parity flow is set. The common header 714 and 736 stores the same information as that in FIG. 5.

Figure 8:
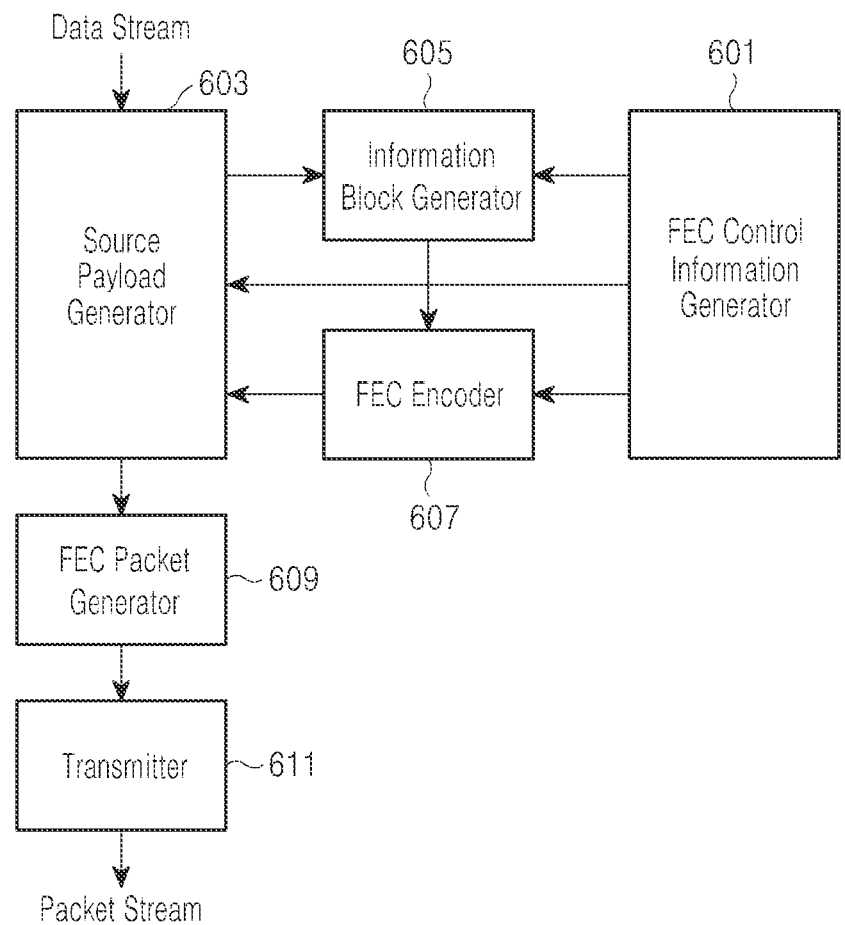
FIG. 8 is a block diagram illustrating a structure of a transmitting apparatus according to an exemplary embodiment of the present invention.

FIG. 8 is a block diagram illustrating a structure of a transmitting apparatus according to an exemplary embodiment of the present invention.

Referring to FIG. 8, an FEC control information generator 601 determines whether FEC is applied or not, and generates FEC-related control information if FEC is applied. A source payload generator 603 receives a data stream for transmission of an MMT asset from an upper encapsulation layer, divides it into data payloads of a predetermined size, and adds a common header and an optional header thereto, to generate a source payload. Based on the FEC control information from the FEC control information generator 601, the source payload generator 603 transfers, to an information block generator 605, a source block comprised of a predetermined number of source payloads from a sequence of source payloads having the same FEC flow.

Based on the FEC control information, the information block generator 605 generates an information block from the source block received from the source payload generator 603, and outputs the information block to an FEC encoder 607. Based on the input information block and the FEC control information, the FEC encoder 607 generates predetermined parity data and inputs it to the source payload generator 603. Based on the FEC control information, the source payload generator 603 generates a parity payload with the input parity data.

An FEC packet generator 609 generates an FEC parity packet by adding a common header and an FEC header to the parity payload, generates an FEC source packet by adding an FEC header to the generated source payload, and outputs the final FEC packets to a transmitter 611. The transmitter 611 transmits the FEC packets to the lower layer. If FEC is not applied, then the source payload generator 603 and the FEC packet generator 609 generate a source payload based on the data stream and FEC control information, and then transfer it to the transmitter 611 as an FEC packet. In the case of the MMT system illustrated in FIG. 2, the FEC packet is transferred with the MMT D.2 Layer or an application protocol like RTP.

Although not illustrated in the drawing, a controller divides a data stream into data payloads of a predetermined size and adds a header to each of the data payloads to generate a source payload. The controller adds a first FEC payload ID to the source payload and applies FEC encoding thereto to generate an FEC source packet for a source payload. The controller adds a second FEC payload ID to at least one parity payload and applies FEC encoding thereto to generate an FEC parity packet for the at least one parity payload. The transmitter 611 transmits the FEC source packet and the FEC parity packet.

Figure 9:
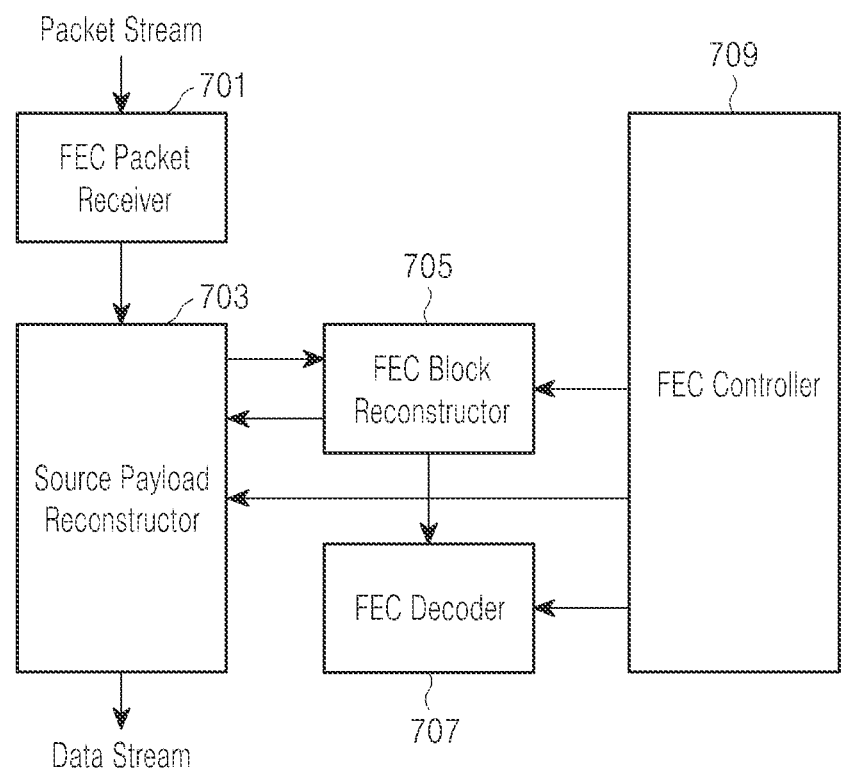
FIG. 9 is a block diagram illustrating a structure of a receiving apparatus according to an exemplary embodiment of the present invention.

FIG. 9 is a block diagram illustrating a structure of a receiving apparatus according to an exemplary embodiment of the present invention.

Referring to FIG. 9, an FEC packet receiver 701 receives a packet stream, then determines, based on a common header of a packet, whether FEC is applied to the packet and whether the packet is a source packet or a parity packet, then acquires FEC-related control information from an FEC header of the source packet and an FEC header of the parity packet if FEC is applied to the packet, and then transfers the FEC-related control information to an FEC controller 709. If there are multiple FEC flows, the FEC controller 709 distinguishes flow-specific control information and performs FEC decoding for each flow.

A source payload reconstructor 703 transfers, to a data stream unit, data of the packet, i.e., a source payload, to which FEC is not applied, from among the received FEC packets. If FEC is applied, then the source payload reconstructor 703 distinguishes source payloads which are not received as source payloads received in packets having the same FEC flow. If the source payload reconstructor 703 has received all of the source payloads based on the FEC control information, then it outputs data corresponding thereto.

Otherwise, the source payload reconstructor 703 outputs the received parity payloads from the FEC parity packet to an FEC block reconstructor 705 together with the received source payloads. The FEC block reconstructor 705 reconstructs an FEC block comprised of an information block and a parity block from the received source payloads and parity payloads based on the FEC control information by erasing the lost payloads, and outputs the reconstructed FEC block to an FEC decoder 707.

Based on the FEC control information received from the FEC controller 709, the FEC decoder 707 recovers the lost information payloads by performing FEC decoding, and outputs the recovered information payloads to the FEC block reconstructor 705. Based on the FEC control information, the FEC block reconstructor 705 recovers a source payload from the recovered information payloads if necessary, using, for example, the information payload reconstructed from the received source payloads, and outputs the recovered source payload to the source payload reconstructor 703. The source payload reconstructor 703 transfers data of the recovered source payload and received source payloads to the upper layer.

In the exemplary embodiment of FIG. 9, the FEC controller 709 distinguishes an in-band signal from an out-band signal in generating FEC-related control information. The FEC controller 709 transmits the in-band signal in an FEC packet as an FEC header. In the case of the MMT system illustrated in FIG. 2, the FEC controller 709 transmits the out-band signal to a receiver by means of the C. Layer or a Session Description Protocol (SDP).

A controller, which may be any suitable type of hardware such as an Integrated Circuit (IC) and which is not shown, determines whether a packet received from a sender is an FEC source packet and an FEC parity packet, and acquires a source payload from the FEC source packet and a parity payload from the FEC parity packet. The source payload is generated by dividing a data stream into data payloads of a predetermined size, and adding a header to each of the data payloads. The FEC source packet is generated by adding a first FEC payload ID to the source payload and applying an FEC code thereto. The FEC parity packet is generated by adding a second FEC payload ID to the parity payload and applying an FEC code thereto.

Figure 10:
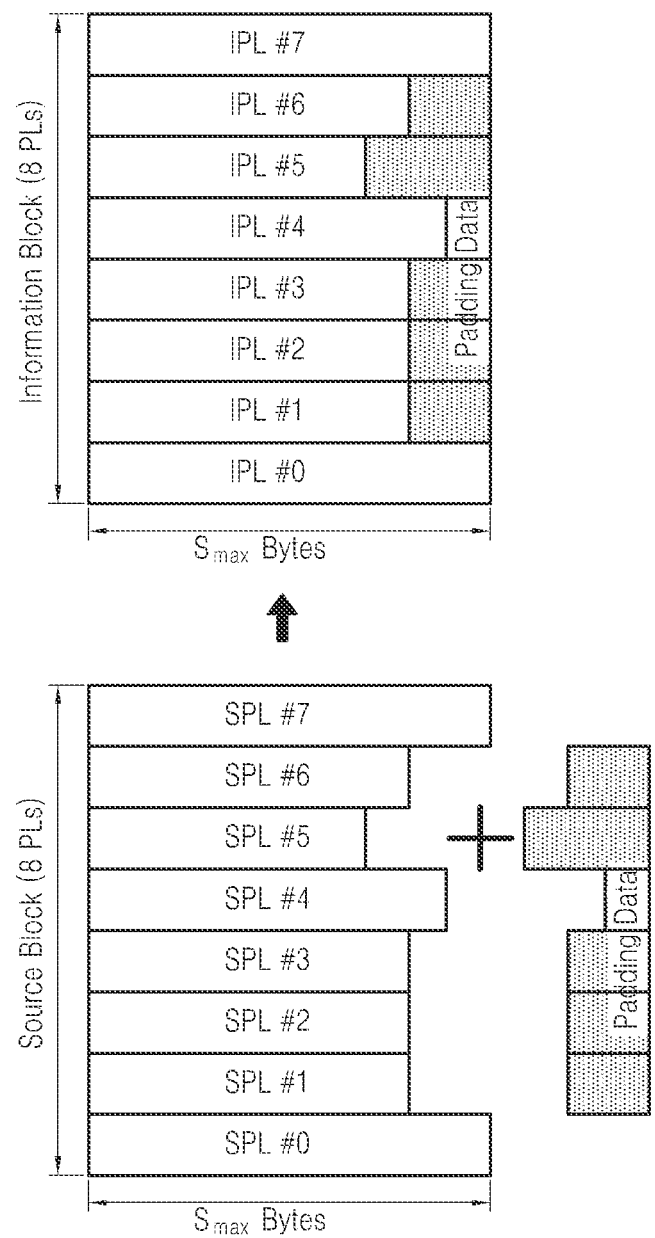
FIG. 10 illustrates an operation of configuring an information block according to an exemplary embodiment of the present invention.

FIG. 10 illustrates an example of configuring an information block in an FEC block generator according to an exemplary embodiment of the present invention.

Referring to FIG. 10, upon receiving 8 source payloads SPL #0 to SPL #7, each having a variable packet size, the FEC block generator adds padding data so as to match the size of each payload to that of the payload having the maxim length, for example, S_max, and then generates an information block comprised of 8 information payloads IPL#0 to IPL#7. Although it is assumed in the exemplary embodiment FIG. 10 that the length of the information payload is set to match with the maximum size S_max of the source payload, the present invention is not limited thereto, and the length of the information payload may be set to be less than S_max depending on the system complexity and memory requirements.

Figure 11:
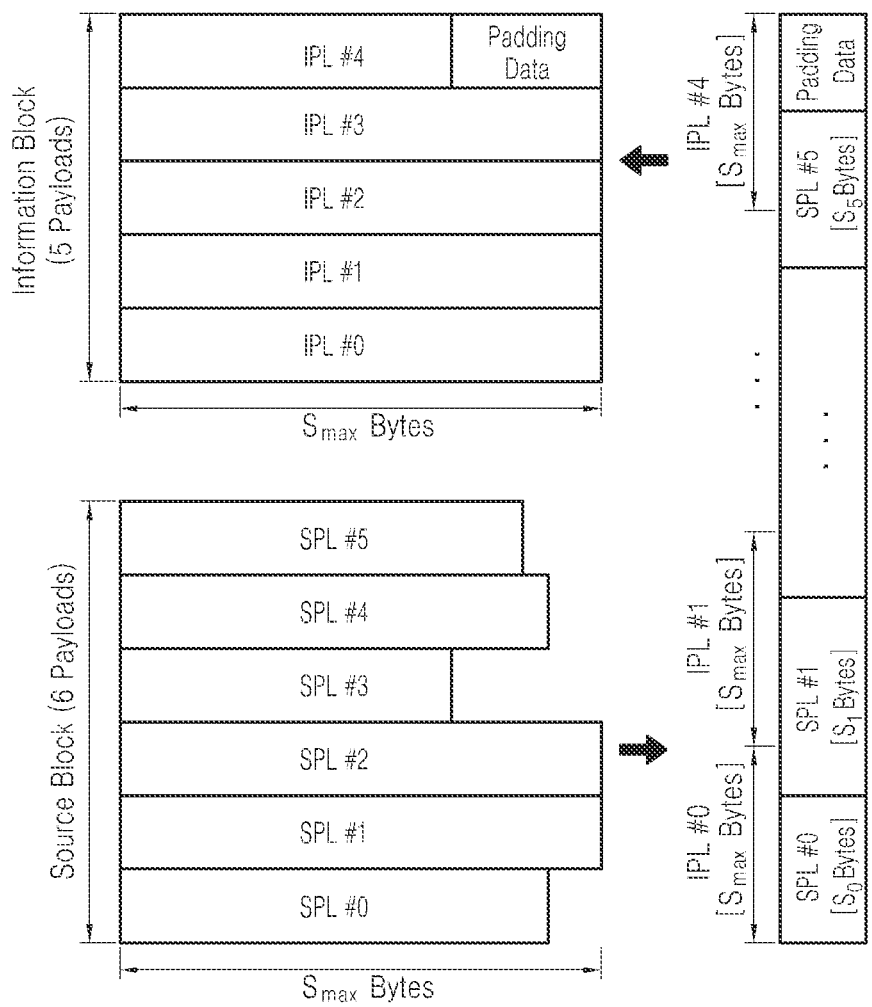
FIG. 11 illustrates an operation of configuring an information block according to another exemplary embodiment of the present invention.

FIG. 11 illustrates an operation of configuring an information block according to another exemplary embodiment of the present invention.

Referring to FIG. 11, upon receiving 6 source payloads SPL #0 to SPL #5, each having a variable packet size, the FEC packet generator arranges payloads having different sizes in a row and divides them in the maximum length, for example, S_max, of an information payload, to generate an information block comprised of 5 information payloads IPL#0 to IPL#4. The last information payload, IPL#4, may include padding data. In the exemplary embodiment of FIG. 11, since a boundary of a source block does not match with a boundary of an information payload, the information required to extract a source payload from an information block, such as the length of each payload, should be included in the information block, or should be delivered to a receiver in a separate way. Although it is assumed in the exemplary embodiment of FIG. 11 that the maximum length S_max of a source payload and the length of an information payload are set to be the same, a length of an information payload may be set to be less than S_max depending on the system complexity and memory requirements.

Referring to FIG. 8, the FEC encoder 607 calculates parity symbols from the input information block using a predetermined FEC encoding algorithm, then generates a parity payload comprised of the parity symbols, and then outputs the parity payload in the form of a parity block.

Figure 12:
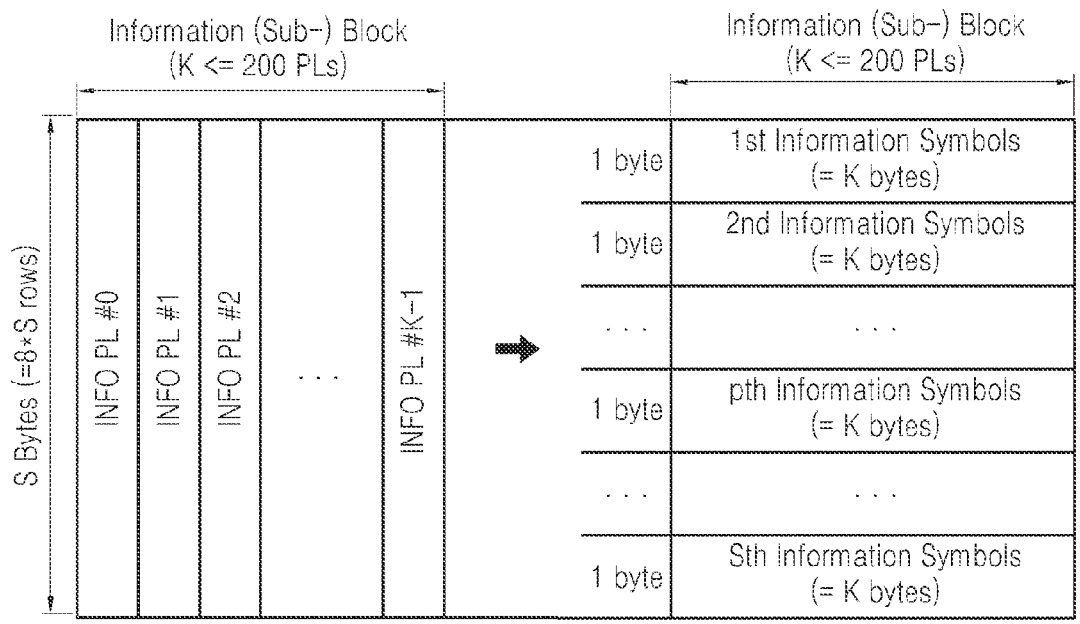
FIG. 12 illustrates a process of mapping an information symbol in an information block when a Reed-Solomon (RS) code is used according to an exemplary embodiment of the present invention.

FIG. 12 illustrates a process of mapping an information symbol in an information block when a Reed-Solomon (RS) code is used according to an exemplary embodiment of the present invention.

Figure 13:
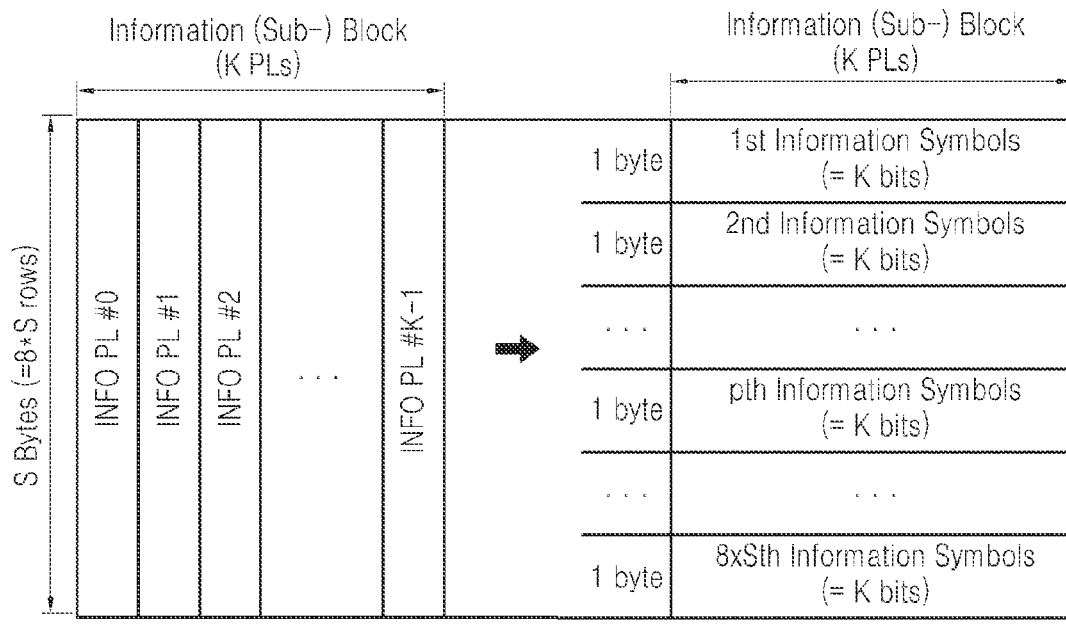
FIG. 13 illustrates a process of mapping an information symbol in an information block when a Low Density Parity Check (LDPC) code is used according to an exemplary embodiment of the present invention.

FIG. 13 illustrates a process of mapping an information symbol in an information block when a Low Density Parity Check (LDPC) code is used according to an exemplary embodiment of the present invention.

Referring to FIGS. 12 and 13, if K, which is a number of information bits, is less than or equal to 200, from an information block, then the FEC encoder maps a source block to the information block to generate an information symbol for RS coding as illustrated in FIG. 12, or the FEC encoder may generate an information symbol for LDPC coding as illustrated in FIG. 13.

Figure 14:
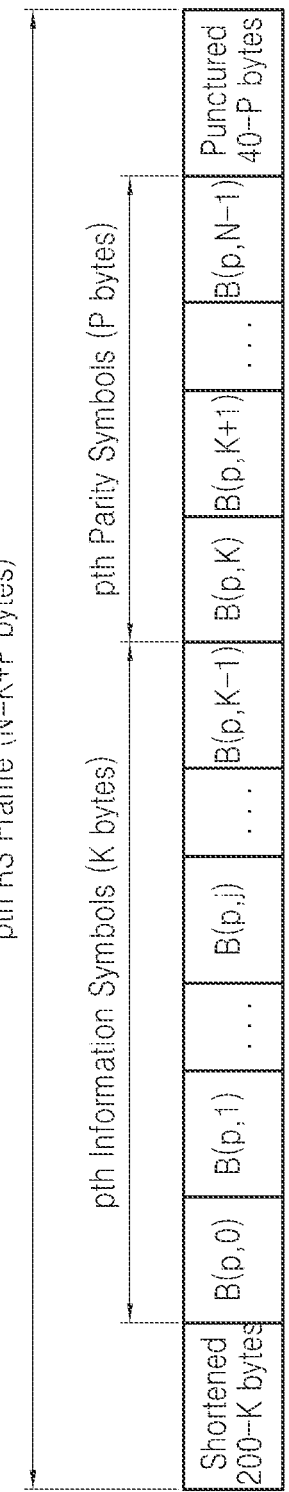
FIG. 14 illustrates a structure of an RS frame according to an exemplary embodiment of the present invention.

FIG. 14 illustrates a structure of a RS frame according to an exemplary embodiment of the present invention.

Figure 15:
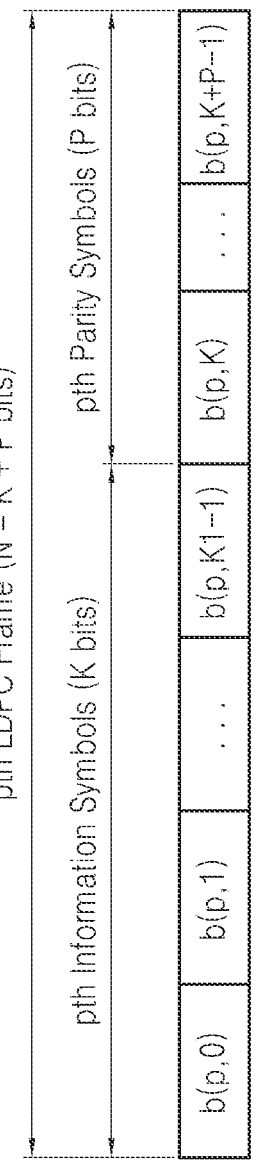
FIG. 15 illustrates a structure of an LDPC frame according to an exemplary embodiment of the present invention.

FIG. 15 illustrates a structure of an LDPC frame according to an exemplary embodiment of the present invention.

Referring to FIGS. 14 and 15, a parity symbol is generated by performing RS and LDPC encoding on each information symbol, as illustrated in FIGS. 14 and 15. In the case of FIG. 15, although shortening and puncturing are not illustrated, a parity symbol may be generated by performing shortening and puncturing for a variety of K information bits and P parity bits using an LDPC code having a predetermined length. It will be apparent to those of ordinary skill in the art that only one of shortening and puncturing may be performed selectively.

Figure 16:
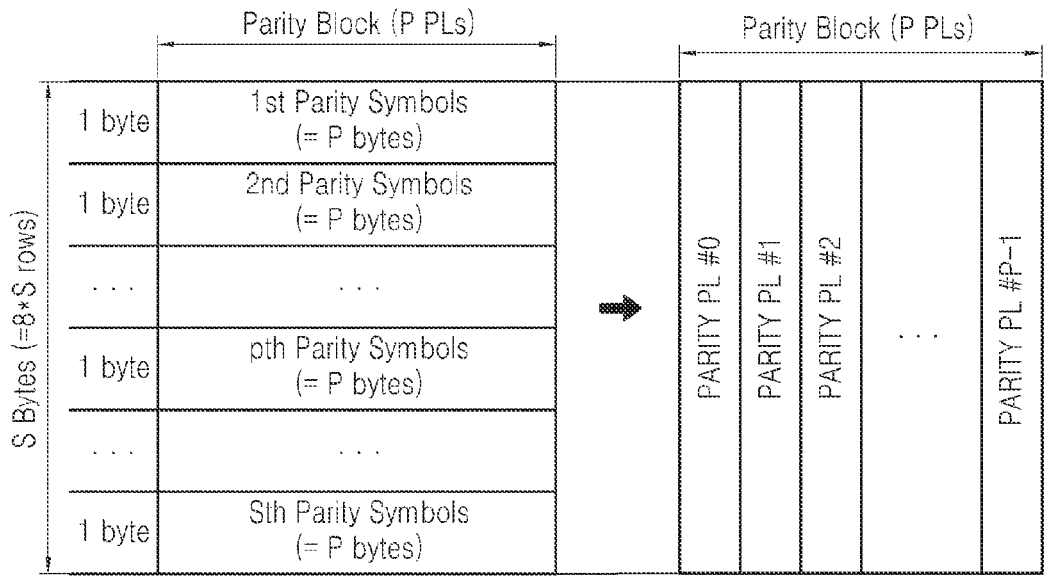
FIG. 16 illustrates parity block mapping for RS parity symbols according to an exemplary embodiment of the present invention.

FIG. 16 illustrates parity block mapping for RS parity symbols according to an exemplary embodiment of the present invention.

Figure 17:
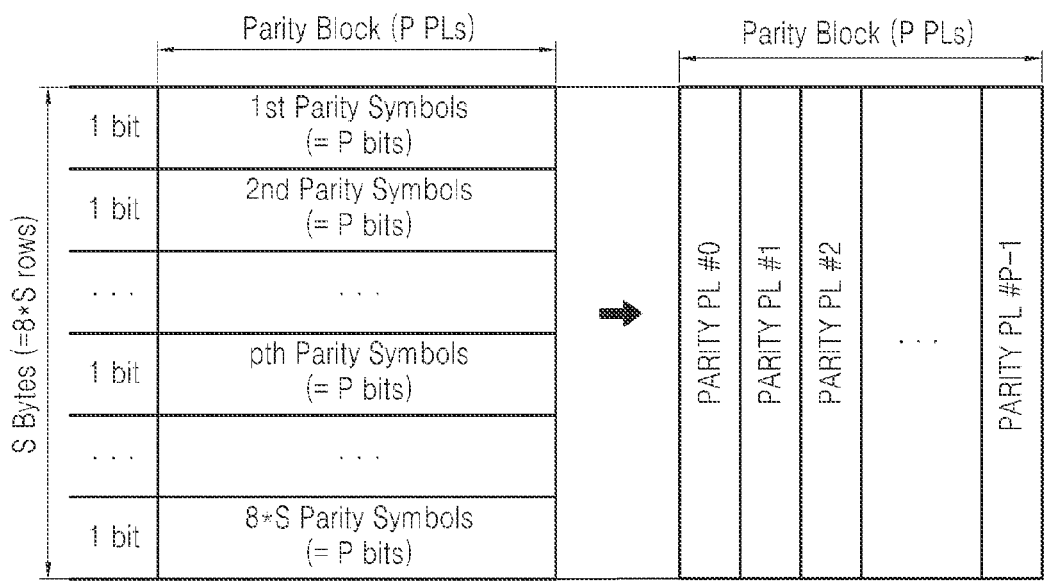
FIG. 17 illustrates parity block mapping for LDPC parity symbols according to an exemplary embodiment of the present invention.

FIG. 17 illustrates parity block mapping for LDPC parity symbols according to an exemplary embodiment of the present invention.

Referring to FIGS. 16 and 17, an RS parity block and an LDPC parity block are generated from the generated parity symbols, as illustrated in FIGS. 16 and 17. Next, RS and LDPC code specifications are illustrated. A primitive polynomial of an RS(N, K) code over the finite field $GF(2^8)$ is defined as $p(x)=x^8+x^4+x^3+x^2+1$. A symbol in $GF(2^8)$ may be represented as $(a^7, a^6, a^5, a^4, a^3, a^2, a, 1)$, where a=00000010 in binary.

Each RS codeword rsc is an RS(240, 40) code over the finite field $GF(2^8)$, which is expressed as rsc=(e0, e1, . . . , e199, p200, . . . , p239) when expressed as a vector. For the RS(240, 40) code, information is 200 bytes and parity is 40 bytes. An LDPC (K+P, K) code over the finite field GF(2) has a Quasi Cyclic (QC)-LDPC structure comprised of K information bits and P parity bits, where K=L× 400, P=L×80, and L=1, 2, 4, 8 or 16. In particular, a parity part of LDPC has an approximate shape of a triangular matrix, as illustrated in FIG. 18.

FIG. 18 illustrates a structure of an H matrix according to an exemplary embodiment of the present invention, in which K=400, and P=L×80 (L=1, 2, 4, 8 or 16).

Referring to FIG. 18, although an RS code and an LDPC code have been considered so far by way of example only, any other codes may be applied, such as FEC codes such as Raptor, RaptorQ, XOR codes, or any other similar and/or suitable codes. An FEC packet generation method according to an exemplary embodiment of the present invention will be described as follows.

The payload type of a common header of each packet is set to correspond to the payload during its transmission. In other words, the payload type of a packet for a source payload indicates a source payload, and the payload type of a packet for a repair payload indicates a repair payload. A sequence number for source packets is sequentially granted. Similarly, a sequence number for repair packets is sequentially granted, but for the repair packets, a starting sequence number is set to start at a starting sequence number of, for example, a source packet so that the boundary of a repair block in the FEC block may be determined. In other words, by setting the sequence numbers for source packets and repair packets in an FEC block to have a correlation, the boundary of repair blocks or the boundary of a repair block, may be determined. A starting sequence number of the FEC block is stored as FEC block boundary information in the header of each packet. When FEC is optionally applied, FEC flag information is also stored in the header. If the number of source packets or repair packets of the FEC block is variable, information about the number of packets or the number of source packets and information about the number of source packets or the number of repair packets of the FEC block may also be stored in the header.

In accordance with an exemplary embodiment of the present invention, a sender may transmit content to which FEC is optionally applied, by signaling or transmitting FEC configuration-related information or other encoding configuration-related information to a receiver. In addition, the sender may optionally apply FEC depending on the network conditions or content QoS. Further, by periodically repeatedly transmitting all or some of FEC control information including FEC configuration-related information or other encoding configuration-related information, or by transmitting all or some of FEC configuration-related information by the proposed in-band signaling method, the sender may provide the FEC configuration-related information even to a new receiver in the situation where the service is already in progress, so that the new receiver may also recover the lost data by performing FEC decoding, making it possible to provide high-quality services to users.

If there is a plurality of data streams, i.e. source flows, output from an application layer, then it is preferable that the transmission system stores information for distinguishing the multiple streams in an FEC packet, for example, FEC Flow ID information, and also stores the same information even in an FEC packet for a stream or a parity flow comprised of a parity payload, which is generated for FEC protection of the stream, during their transmission, thereby allowing the receiver to determine the stream of parity payloads related to each of the multiple streams.

Alternatively, if there is a plurality of data streams output from an application layer, then it is preferable that the transmission system stores information for distinguishing each data stream and each parity payload stream or a parity flow in an FEC packet, for example, a source flow ID and a parity flow ID, during its transmission, and then transmits mapping information to the parity stream, for example, FEC Flow ID 1=Source Flow ID 1+Parity Flow ID 1, generated for FEC protection of each data stream, as separate control information which is different from the FEC packet.

As a result, a receiving apparatus may distinguish each data stream based on the stream identification information in the FEC packet or the separate control information different from the FEC packet, and may determine the parity stream generated for FEC protection of each data stream, so that the receiving apparatus can smoothly perform FEC decoding.

As is apparent from the foregoing description, according to exemplary embodiments of the present invention, a receiving apparatus may provide high-quality services to users, and may easily distinguish an FEC packet by the FEC packet configuration method of the exemplary embodiments described above.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting a transmission packet in a communication system, the method comprising:
   generating a source packet by adding a first payload identifier (ID) to an input transmission packet;
   generating a parity packet by adding a second payload ID to a repair symbol, the repair symbol being generated by encoding a source block; and
   transmitting the source packet and the parity packet as a transmission packet,
   wherein each of the source packet and the parity packet includes a transmission packet header,
   wherein the transmission packet header includes type information indicating if a forward error correction (FEC) encoding is applied to the transmission packet, and
   wherein the second payload ID includes information indicating a boundary of the source block.

2. The method of claim 1, wherein the first payload ID includes a sequence number identifying source symbols included in the source block.

\* \* \* \* \*